United States Patent Office 2,960,441
Patented Nov. 15, 1960

2,960,441

THERAPEUTIC COMPOSITIONS OF SALTS OF 3,3-PENTAMETHYLENE-4-HYDROXYBUTYRIC ACID

Gilbert C. van Wessem, Memmingen, Germany, and Emile L. Sakal, Brookside, N.J., assignors to Warner-Lambert Pharmaceutical Company, Morris Plains, N.J., a corporation of Delaware No Drawing. Filed Sept. 17, 1957, Ser. No. 684,425

10 Claims. (Cl. 167—65)

This invention relates to new pharmaceutical products particularly valuable as central nervous system stimulants.

In accordance with this invention there are provided a new series of compounds consisting of the salts of 3,3-pentamethylene-4-hydroxy butyric acid, the cation of said salt being selected from the group consisting of alkali metal, alkaline earth metal, ammonium and amine cations.

The new compounds of this invention are of therapeutic utility, especially as analeptic agents which may be used for combatting excessive hypnosis such as that resulting from an overdose of barbiturates and also as repiratory and cardiovascular stimulants.

An object of this invention is the preparation of water soluble compounds which are central nervous system stimulants of high therapeutic index and which may be used for oral and parenteral administration in effective dosages without producing undesirable side effects.

Other objects of this invention will appear from the following detailed description.

The compounds of the invention may be prepared as follows:

One mol cyclohexanone is reacted with two mols ethyl cyanoacetate and three mols alcoholic ammonia; the resulting ammonium salt of 4,4-pentamethylene-3,5-dicyan-glutarimide is saponified in acid to yield cyclohexane diacetic acid. An ammoniacal solution of the latter is reacted with silver nitrate to yield the di-silver salt which on reaction with iodine yields β,β-pentamethylene butyrolactone. Reaction of the lactone with aqueous solution of a base yields the corresponding salt of 3,3-pentamethylene-4-hydroxy butyric acid.

The reaction sequence may be represented as follows:

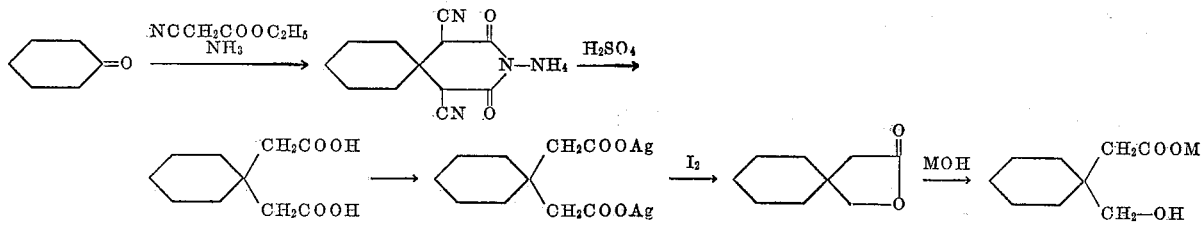

where M represents the cation.

EXAMPLE I

*Step A—Ammonium salt of 4,4-pentamethylene-3,5-dicyanglutarimic acid*

A mixture of 490.5 g. cyclohexanone and 1131 g. ethyl cyanoacetate are cooled to −10° C. 2320 g. 11% alcoholic ammonia are also cooled to −10° C. The ammonia solution is added very slowly to the mixture with stirring, always keeping the temperature of the mixture below 0° C. After the addition of all the ammonia solution, the reactants are kept at −10° C. for four days. The liquor is separated from the crystals, the crystals washed with 500 ml. ether and air dried at 40° C. Yield: 1217 g. (98% of theory).

*Step B—Cyclohexane diacetic acid*

A mixture of 2.7 l. 95.6% sulfuric acid (d=1.84) and 0.72 l. water is heated to 160° C. in a 10 l., 3-neck flask equipped with condenser, mixer and powder funnel. Slowly 1217 g. of the ammonium salt of 4,4-pentanmethylene-3,5-dicyan-glutarimic acid is added with stirring. The temperature is raised to 190° C. and maintained for five hours. The mixture is allowed to cool overnight, the black crystalline precipitate is filtered off and washed with 50 ml. water. The precipitate is dissolved in 4 l. 10% NaOH, filtered and 600 ml. concentrated HCl added to precipitate the acid. The precipitate is filtered off, washed with water and dried at 80° C.

The crude acid (850 g.) is dissolved in 3.4 l. alcohol at boiling temperature, filtered hot and the light brown filtrate diluted with 6 l. water. After cooling, the light brown precipitate is filtered, washed with water and dried at 80° C. Yield: 585 g. (65% of theory).

*Step C—Di-silver salt of cyclohexane diacetic acid*

A slurry of 585 g. cyclohexane diacetic acid in 6.6 l. water is mixed with 438 ml. 25% aqueous ammonia and stirred until dissolved. The solution is filtered and added to 994 g. silver nitrate in 1.5 l. water. The precipitate is filtered, reslurried with water, filtered, reslurried, etc., until the wash water is free of nitrate (Ring test as iron nitrosulfate). The white salt dried in vacuum at 60° C. in the dark. Yield: 1140 g. (94.3% of theory).

*Step D—β,β-pentamethylene butyrolactone*

A mixture of 1140 g. of the di-silver salt of cyclohexane diacetic acid, 700 g. iodine and 7 l. nitrobenzene are heated to 160° C. with rapid stirring for three hours. After cooling the silver iodide is filtered off, washed with 200 ml. nitrobenzene, combined with the filtrate and distilled in vacuum. The lactone (268 g.) distills between 135° C. and 150° C. at 12 mm.

The product is decolorized by dissolving in 700 ml. of 10% aqueous NaOH, extracting with 100 ml. ether and treatment with 1 g. activated charcoal, which is filtered off. Acidification of solution with 200 ml. concentrated HCl yields a yellow oil which is separated. The aqueous phase is extracted twice with 100 ml. benzene and the combined lactone and extracts distilled in vacuum. Yield: 268 g. (63% of theory) B.P. 135–138° C. at 12 mm.

*Step E—Sodium 3,3-pentamethylene-4-hydroxy butyrate*

96.5 g. β,β-pentamethylene butyrolactone and 251.5 ml. 10% aqueous NaOH are heated to boiling with stirring. After cooling the solution is extracted with 50 ml. ether, the extarct discarded, the solution treated with 1 g. activated charcoal, filtered and evaporated to dryness on a water bath. The residue is recrystallized three times from 750 ml. of n-butanol-benzene (2:3) mixture, washed with ether, andd ried at 40° C. The white platelets contain 1 mol. water of crystallization. Yield: 94.6 g. (71% theory); M.P. 104–107° C. block method. Analysis: calculated 50.94% C, 8.07% H, 10.83% Na; Found 50.80% C, 7.82% H, 10.85% Na.

The anhydrous salt may be obtained by evaporating a suspension of the hydrate in benzene to dryness, washing with absolute ether and dried in vacuum. The anhydrous salt is hygroscopic. Analysis: Calculated 55.66% C, 7.78% H, 11.84% Na; Found 55.50% C, 7.58% H, 11.38% Na. Solubility: Readily soluble in water, methanol and ethanol. Difficultly soluble in ether and acetone.

EXAMPLE II

*Calcium 3,3-pentamethylene-4-hydroxy butyrate*

15.6 g. β,β-pentamethylene butyrolactone, 3.7 g. calcium hydroxide and 250 ml. water are heated to boiling, extracted with ether, treated with activated charcoal and evaporated as in Step E of Example I. The salt is crystallized from a hot solution in 100 ml. butanol-benzene (1:1) by the addition of 50 ml. absolute alcohol. The white rod-shaped crystals are washed with ether and dried in vacuum at 50° C. Yield: 2 g. (10% theory) M.P. 205° C. Analysis: Calculated 56.52% C, 7.91% H, 10.47% Ca; Found 56.85% C, 8.09% H, 10.28% Ca. The salt is hygroscopic, readily soluble in water and difficultly soluble in ethanol.

EXAMPLE III

*Ammonium 3,3-pentamethylene-4-hydroxy butyrate*

15.6 g. β,β-pentamethylene butyrolactone and 150 ml. aqueous ammonia are kept at 80° C. with agitation and gaseous ammonia introduced until no more organic phase is precipitated. The solution is extracted with ether, treated with activated charcoal and evaporated to dryness in vacuum at 50° C. The residue is dissolved in 20 ml. ethanol and is crystallized by addition of 20 ml. acetone as white rod-shaped crystals. Yield: 10.5 g. (55.5% theory), M.P. 104–105.5° C. with decomposition. Analysis: Calculated 57.12% C, 10.12% H, 7.40% N; Found 57.31% C, 9.98% H, 7.32% N. The salt is readily soluble in water, methanol and ethanol; difficultly soluble in acetone, ether and petroleum ether.

EXAMPLE IV

*Barium 3,3-pentamethylene-4-hydroxy butyrate*

13 g. β,β-pentamethylene butyrolactone, 10.6 g. barium hydroxide octahydrate and 200 ml. water are heated to boiling. Extraction with ether, treatment with activated charcoal and evaporation in vacuum yields the barium salt which is dissolved in 100 ml. hot butanol-benzene (1:1), 100 ml. ethanol added, filtered and acetone added drop by drop until the solution becomes slightly turbid. After standing at 40° C., fine white crystals are obtained which are washed with 10 ml. of ether and dried in vacuum. Yield: 5 g. (35% of theory). Melting point determination is not possible as the substance sinters over a broad temperature range without melting. Analysis: Calculated 45.07% C, 6.30% H, 28.62% Ba; Found 44.93% C, 6.73% H, 28.44% Ba. The hygroscopic salt is readily soluble in water and benzene; difficultly soluble in ethanol, acetone and ether.

EXAMPLE V

*Piperidine salt of 3,3-pentamethylene-4-hydroxy butyric acid*

7.8 g. β,β-pentamethylene butyrolactone, 8.5 g. piperidine and 50 ml. water are refluxed for one hour and evaporated to dryness. The residue is recrystallized three times from acetone and dried in vacuum at 50° C. over $P_2O_5$ as square white crystals. Yield: 7 g. (55% of theory) M.P. 103–104.5° C. Analysis: Calculated 65.34% C, 10.58% H, 5.44% N; Found 65.37% C, 10.52% H, 5.33% N. The product is readily soluble in water, ethanol and hot acetone.

EXAMPLE VI

*Potassium 3,3-pentamethylene-4-hydroxy butyrate*

7.7 g. β,β-pentamethylene butyrolactone and 30 ml. 10% aqueous KOH (containing 3.3 g. 85% KOH) are heated to boiling, extracted with 10 ml. ether, decolorized with activated charcoal and evaporated to dryness in vacuum. The residue is warmed in 100 ml. acetone and butanol added drop by drop until complete solution occurs. White platelets are obtained on cooling. After two recrystallizations, yield: 4 g. (37% of theory). M.P. 154–156° C. Analysis: Calculated 51.40% C, 7.19% H, 18.60% K; Found 51.40% C, 7.41% H, 18.54% K. The product is readily soluble in water, methanol, ethanol, butanol and acetic ether; difficultly soluble in benzene, petroleum ether, ether, hexane and dioxane.

EXAMPLE VII

*1-desoxyephedrine salt of 3,3-pentamethylene-4-hydroxy butyric acid*

3.71 g. 1-desoxyephedrine hydrochloride are dissolved in 50 ml. absolute ethanol, 4.25 g. sodium 3,3-pentamethylene-4-hydroxy butyrate are dissolved in 25 ml. absolute ethanol and the two solutions mixed. After standing two hours at 50° C., the NaCL is filtered off and the filtrate evaporated in vacuum. The tacky yellow residue is taken up in 20 ml. benzene, filtered and the benzene distilled in vacuum. The residue is crystallized by rubbing with a glass rod. The crystals are dissolved in 30 ml. warm ether, filtered and the solution cooled. Recrystallization from 10 ml. of acetone-ether (1:10) yields white spike crystals. Yield: 1.3 g. (20% of theory). M.P. 59.5–61° C. Analysis: Calculated 70.98% C, 9.72% H, 4.36% N; Found 71.00% C, 9.68% H, 4.61% N. The salt is readily soluble in water, methanol, ethanol and acetone.

EXAMPLE VIII

*1-ephedrine salt of 3,3-pentamethylene-4-hydroxy butyric acid*

7.42 g. 1-ephedrine hydrochloride in 200 ml. absolute ethanol and 7.84 g. sodium 3,3-pentamethylene-4-hydroxy butyrate in 50 ml. absolute ethanol are mixed and treated as in Example VII to yield a crude tacky 1-ephedrine salt. This is taken up in 20 ml. benzene, rubbed, solvent removed by vacuum distillation and crystallization of the residue induced by rubbing with a glass rod. The crystals are washed with 5 ml. ether and recrystallized twice from 20 ml. ether-acetone (10:1) to yield white spikes. Yield: 2 g. (22% of theory). M.P. 77.5–79° C. Analysis: Calculated 67.62% C, 9.26% H, 4.15% N; Found 67.53% C, 9.36% H, 4.31% N. The product is readily soluble in water, ethanol and benzene; difficultly soluble in ether, petroleum ether and cyclohexane.

EXAMPLE IX

*Morpholine salt of 3,3-pentamethylene-4-hydroxy butyric acid*

5 g. ammonium 3,3-pentamethylene-4-hydroxy butyrate are dissolved in 8 g. morpholine and placed in a desiccator over $H_2SO_4$. The desiccator is evacuated for four days when the salt has completely crystallized. The crystals are dissolved 20 ml. hot benzene-ether (1:1), filtered, the crystals separated, and washed twice with 20 ml. ether to yield white cubic crystals. Yield: 0.3 g. (4.5% of theory). M.P. 68–69.5° C. Analysis: Calculated 60.20% C, 9.72% H, 5.41% N; Found 6.28% C, 9.79% H, 5.22% N. The product is readily soluble in water, methanol, ethanol, butanol, acetone, benzene, chloroform, carbon tetrachloride, dioxane and acetic ether; difficultly soluble in ether, petroleum ether and hexane.

In a manner similar to Examples I–VIII, other alkali, alkaline earth and amine salts of 3,3-pentamethylene-4-hydroxy butyric acid may be prepared.

The salts may be administered in the form of aqueous solutions, tablets, or suppositories for oral or parenteral administrations. Suitable compositions include:

Suppositories:
- Sodium salt of Example I _____ mg__ 20
- Cerva flava (beeswax) _____ mg__ 100
- Cacao butter _____ g__ 1.88

Tablets:
- Ammonium salt of Example III _____ mg__ 10
- Lactose _____ mg__ 80
- Corn starch _____ mg__ 90
- Talc _____ mg__ 15
- Formaldehyde gelatin _____ mg__ 4
- Magnesium stearate _____ mg__ 0.5

Water solutions (ampules):
- Calcium salt of Example II _____ g__ 8
- Demineralized water _____ ml__ 800

Put in 1.1 ml. ampules and sterilized.

The dosage units preferably contain 10 to 20 mg. per dose, although from 5 to 100 mg. may be used.

While the invention has been described with particular embodiments thereof, it will be understood that in its broadest aspect, the invention may be variously embodied within the scope of the invention as set forth herein and in the appended claims.

What is claimed is:

1. A therapeutic composition in dosage unit form comprising not more than 100 milligrams of a salt of 3,3-pentamethylene-4-hydroxy butyric acid, the cation of said salt being selected from the group consisting of alkali metal, alkaline earth metal and ammonium, and a pharmaceutical carrier.

2. A therapeutic composition according to claim 1 wherein said cation is sodium.

3. A therapeutic composition according to claim 1 wherein said cation is ammonium.

4. A therapeutic composition according to claim 1 wherein said cation is calcium.

5. A therapeutic composition according to claim 1 wherein said cation is barium.

6. A therapeutic composition according to claim 1 wherein said cation is potassium.

7. A therapeutic composition in dosage unit form comprising 5 to 100 milligrams of sodium 3,3-pentamethylene-4-hydroxy butyrate and a pharmaceutical carrier.

8. A therapeutic composition according to claim 7 wherein a liquid pharmaceutical carrier is employed.

9. A therapeutic composition according to claim 7 wherein a solid pharmaceutical carrier is employed.

10. A therapeutic composition according to claim 9 in the form of a tablet.

References Cited in the file of this patent

UNITED STATES PATENTS 2,460,240     Pickel et al. _____ Jan. 25, 1949

OTHER REFERENCES

C. A., vol. 17, 1923, p. 2869[7].

UNITED STATES PATENT OFFICE

CERTIFICATION OF CORRECTION

Patent No. 2,960,441             November 15, 1960

Gilbert C. van Wessem et al.

It is hereby certified that error appears in the above numbered patent requiring correction and that the said Letters Patent should read as corrected below.

In the grant, line 2, and in the heading to the printed specification, line 6, name of co-inventor, for "Emile L. Sakal", each occurrence, read -- Emile H. Sakal --.

Signed and sealed this 9th day of May 1961.

(SEAL)
Attest:

ERNEST W. SWIDER                        DAVID L. LADD
Attesting Officer                       Commissioner of Patents